(12) United States Patent
Dutt et al.

(10) Patent No.: US 11,657,386 B2
(45) Date of Patent: May 23, 2023

(54) REFERENCE-BASED CARD ENROLLMENT FOR SECONDARY DEVICES

(71) Applicant: Samsung Electronics Co., Ltd., Suwon-si (KR)

(72) Inventors: Bharat Dutt, Mountain View, CA (US); Balakrishna Venkataraman, Mountain View, CA (US); Aneesh Nainamvalappil, Mountain View, CA (US); Minseok Park, Mountain View, CA (US); Chung Liu, Mountain View, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 953 days.

(21) Appl. No.: 15/243,745

(22) Filed: Aug. 22, 2016

(65) Prior Publication Data
US 2017/0053277 A1    Feb. 23, 2017

Related U.S. Application Data

(60) Provisional application No. 62/208,296, filed on Aug. 21, 2015.

(51) Int. Cl.
*G06Q 20/36* (2012.01)
*G06Q 20/32* (2012.01)

(52) U.S. Cl.
CPC ....... *G06Q 20/363* (2013.01); *G06Q 20/3223* (2013.01)

(58) Field of Classification Search
CPC .................................................. G06Q 20/363
USPC ........................................................... 705/44
See application file for complete search history.

(56) References Cited

U.S. PATENT DOCUMENTS

| | | | | |
|---|---|---|---|---|
| 8,346,672 B1 * | 1/2013 | Weiner | ................. | G06Q 20/425 705/64 |
| 2006/0288233 A1 * | 12/2006 | Kozlay | .................. | G07C 9/257 713/186 |
| 2008/0235144 A1 * | 9/2008 | Phillips | ................. | G06Q 20/367 705/67 |
| 2009/0037285 A1 * | 2/2009 | Murphy | ............... | G06Q 20/327 705/16 |
| 2012/0024947 A1 * | 2/2012 | Naelon | ................. | G06Q 20/321 235/380 |
| 2012/0266220 A1 * | 10/2012 | Brudnicki | ............. | G06F 21/629 726/6 |

(Continued)

FOREIGN PATENT DOCUMENTS

WO    WO-2009039419 A1 *    3/2009    ......... G06K 19/0723

OTHER PUBLICATIONS

Title: Secure Mobile Payment via Trusted Computing Authors: Qi Li, et al. Publication: IEEE Date: 2008 (Year: 2008).*

*Primary Examiner* — Christopher Bridges
*Assistant Examiner* — Yongsik Park

(57) ABSTRACT

An apparatus and method for reference-based card enrollment for secondary devices are provided. The method includes receiving information of a payment instrument from a first device, transmitting the information of the payment instrument to a payment network, receiving, by the payment system, a unique account reference identification (ID) corresponding to the payment instrument, and using the account reference ID to enable a second device to use the payment instrument.

20 Claims, 8 Drawing Sheets

(56) References Cited

U.S. PATENT DOCUMENTS

| | | | |
|---|---|---|---|
| 2013/0151400 A1* | 6/2013 | Makhotin | G06Q 20/3263 705/39 |
| 2014/0344153 A1* | 11/2014 | Raj | G06Q 20/3821 705/44 |
| 2015/0120838 A1* | 4/2015 | Vadla Ravnas | H04W 4/21 709/227 |
| 2015/0262137 A1* | 9/2015 | Armstrong | G06Q 20/388 705/41 |
| 2015/0271091 A1* | 9/2015 | Maruyama | H04L 47/78 709/226 |
| 2015/0348025 A1* | 12/2015 | Brown | G06Q 20/367 705/41 |
| 2016/0171480 A1* | 6/2016 | O'Regan | G06Q 20/3227 705/67 |
| 2016/0232521 A1* | 8/2016 | Sharp | G06Q 20/3229 |
| 2016/0358180 A1* | 12/2016 | Van Os | G06Q 20/321 |

\* cited by examiner

REFERENCE-BASED CARD ENROLLMENT FOR SECONDARY DEVICES

CROSS-REFERENCE TO RELATED APPLICATION(S)

This application claims the benefit under 35 U.S.C. § 119(e) of a U.S. Provisional application filed on Aug. 21, 2015, in the U.S. Patent and Trademark Office and assigned Ser. No. 62/208,296, the entire disclosure of which is hereby incorporated by reference.

TECHNICAL FIELD

The present disclosure relates to an apparatus and method for reference-based card enrollment for secondary devices. More particularly, the present disclosure relates to an apparatus and method for enrolling secondary devices to use cards without requiring a user to re-enter the card information.

BACKGROUND

Mobile terminals are developed to provide wireless communication between users. As technology has advanced, mobile terminals now provide many additional features beyond simple telephone conversation. For example, mobile terminals are now able to provide additional functions such as an alarm, a Short Messaging Service (SMS), a Multimedia Message Service (MMS), E-mail, games, remote control of short range communication, an image capturing function using a mounted digital camera, a multimedia function for providing audio and video content, a scheduling function, and many more. With the plurality of features now provided, a mobile terminal has effectively become a necessity of daily life.

Card-based payment products are electronic money products that provide the customer with a portable, specialized computer device, typically an integrated circuit card containing a microprocessor chip. Consumers use these cards to make payments instead of making cash payments. The purpose of card-based contactless payment systems like Samsung Pay, Apple Pay, Android Pay, Google Wallet, etc., is to allow people to use their smartphones, tablets and wearables (like smartwatches) to make payments. That is, the consumer can present their smartphone, wearable device, etc., to communicate their card number or other payment information, without requiring the user to pull out the actual card.

Today, people carry multiple devices like smartphones and wearables. Many times, consumers may carry two or more of the same kind of device. When users have multiple devices, they often don't carry all of the devices together. They may have any number of different devices with them, at any given time. Hence, it is important that they should be equally able to make payments using any of those devices. A mobile payment application and system enable users to pay using any device, including wearables.

With more and more people adopting smart devices, owning more than one smartphone or wearables is increasing. This creates a problem, as consumers are currently forced to enroll their cards on multiple devices to be able to use them on each device. Enrolling a card requires time and effort, on the part of the consumers. Many customers find such tasks tedious and hence sometimes skip doing this, instead relying on the devices which already have the card information enrolled.

Authentication and authorization activities are important and unavoidable for security of a complete platform. Accordingly, there is a need for an apparatus and method for a unique reference for card information of the consumer maintained by a payment system and payment network.

SUMMARY

Aspects of the present disclosure are to address at least the above-mentioned problems and/or disadvantages and to provide at least the advantages described below. Accordingly, an aspect of the present disclosure is to provide an apparatus and method for creating a unique reference for card information of the consumer, maintained by payment system and payment network. This unique reference eliminates redundant steps of re-entering card information on each device, and makes the experience of the consumer as seamless as possible.

In accordance with an aspect of the present disclosure, a method for reference-based card enrollment for secondary devices is provided. The method includes receiving information of a payment instrument from a first device, transmitting the information of the payment instrument to a payment network, receiving, by the payment system, a unique account reference identification (ID) corresponding to the payment instrument, and using the account reference ID to enable a second device to use the payment instrument.

In accordance with another aspect of the present disclosure, a portable electronic device is provided. The device includes at least one processor, a display, and at least one memory configured to store instructions to be executed by the at least one processor. The instructions, when executed by the at least one processor, cause the at least one processor to control to receive information corresponding to a payment instrument, from a payment system, select the payment instrument using the received information, and enable use of the selected payment instrument from the device.

In accordance with yet another aspect of the present disclosure, a method by a payment system of managing payment instrument use is provided. The method includes receiving information of a payment instrument from a device logged in to a user account, transmitting the information of the payment instrument to a corresponding payment network, receiving an account reference ID corresponding to the payment instrument, storing the account reference ID according to the user account, receiving a token and a token ID each corresponding to the account reference ID and the device, storing the token ID according to the user account, the account reference ID, and the device, and transmitting the token to the device.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of various embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
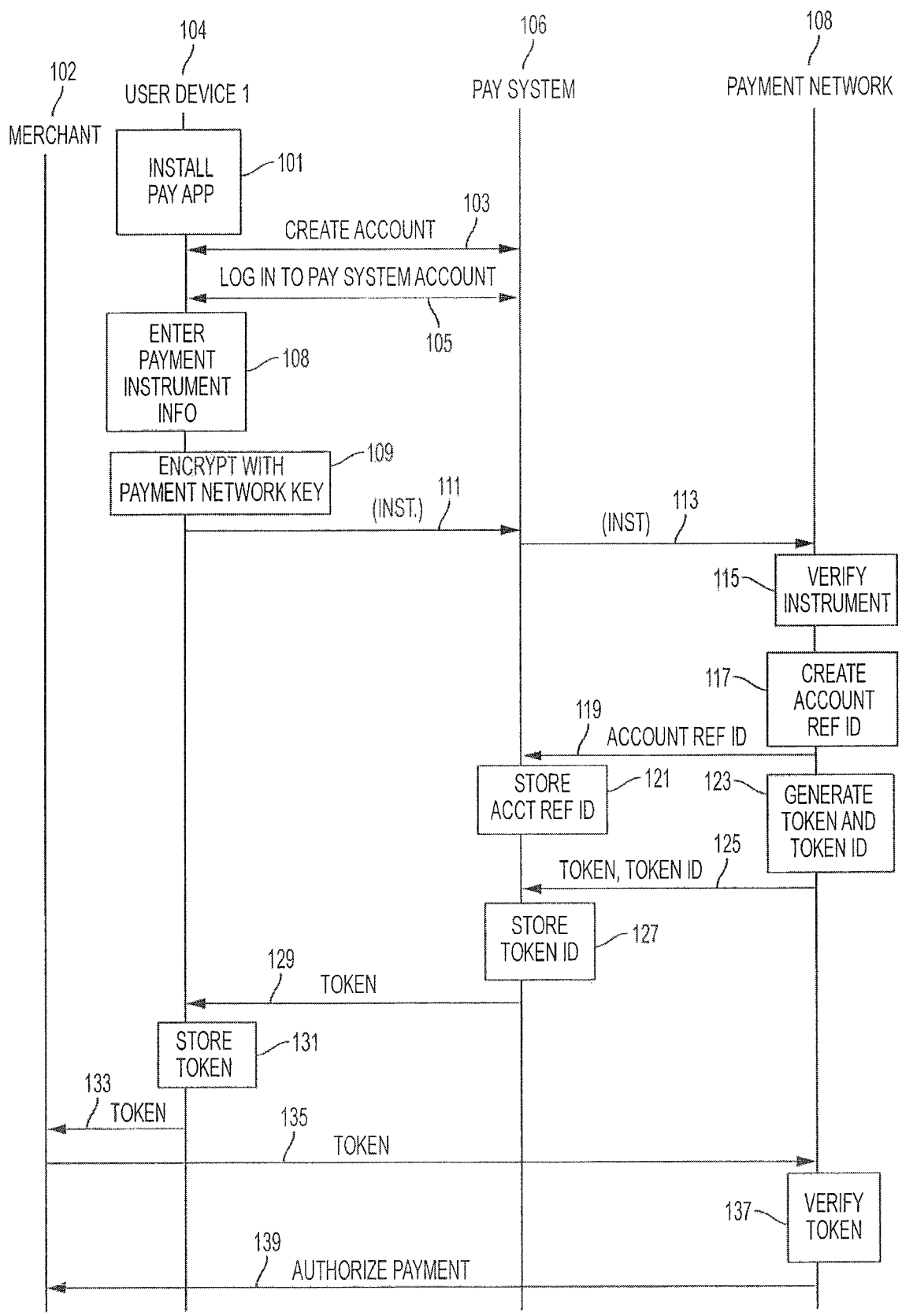
FIG. 1 illustrates a process of registering and using a payment instrument on a first user device according to an embodiment of the present disclosure.

Detailed descriptions of various aspects of the present disclosure will be discussed below with reference to the attached drawings. The descriptions are set forth as examples only, and shall not limit the scope of the present disclosure.

The detailed description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the disclosure. In addition, descriptions of well-known functions and constructions are omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the present disclosure are provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Unless defined differently, all terms used in the present disclosure, including technical or scientific terms, have meanings that are understood generally by a person having ordinary skill in the art. Ordinary terms that may be defined in a dictionary should be understood to have the meaning consistent with their context, and unless clearly defined in the present disclosure, should not be interpreted to be excessively idealistic or formalistic.

According to various embodiments of the present disclosure, an electronic device may include communication functionality. For example, an electronic device may be a smart phone, a tablet Personal Computer (PC), a mobile phone, a video phone, an e-book reader, a desktop PC, a laptop PC, a netbook PC, a Personal Digital Assistant (PDA), a Portable Multimedia Player (PMP), an MP3 player, a mobile medical device, a camera, a wearable device (e.g., a Head-Mounted Device (HMD), electronic clothes, electronic braces, an electronic necklace, an electronic appcessory, an electronic tattoo, or a smart watch), and/or the like.

According to various embodiments of the present disclosure, an electronic device may be a smart home appliance with communication functionality. A smart home appliance may be, for example, a television, a Digital Video Disk (DVD) player, an audio, a refrigerator, an air conditioner, a vacuum cleaner, an oven, a microwave oven, a washer, a dryer, an air purifier, a set-top box, a TV box (e.g., Samsung HomeSync™, Apple TV™, or Google TV™), a gaming console, an electronic dictionary, an electronic key, a camcorder, an electronic picture frame, and/or the like.

According to various embodiments of the present disclosure, an electronic device may be any combination of the foregoing devices. In addition, it will be apparent to one having ordinary skill in the art that an electronic device according to various embodiments of the present disclosure is not limited to the foregoing devices.

The following glossary of terms and acronyms will have the indicated meanings when used in this application.

PAN refers to a primary account number. Examples of a PAN include the card number on a credit card or debit card.

A payment instrument may include an encrypted PAN.

A token requester refers to an entity or server which makes requests to payment networks on behalf of the consumer's device.

A wallet refers to the online wallet account of the consumer (like Samsung Wallet, Google Wallet, etc.). For example, a wallet account might manage or facilitate the use of at least one payment instrument for a particular user.

An Account Ref ID refers to a unique reference for the payment instrument.

A primary device refers to the device on which the consumer enrolls a PAN for the first time.

A secondary device refers to another device the consumer owns and wants to enroll on the device the same PAN enrolled on the primary device.

A payment network refers generally to a financial service network through which financial transactions are conducted, such as Visa, Mastercard, etc.

In a mobile payment service such as Samsung Pay, Apple Pay, etc., multiple security advantages are provided over the previous card-swipe (magnetic stripe) payment model. A magnetic stripe card is a type of card capable of storing data by modifying the magnetism of tiny iron-based magnetic particles on a band of magnetic material on the card. The magnetic stripe, sometimes called swipe card or magstripe, is read by swiping past a magnetic reading head. Magnetic stripe cards are commonly used in credit cards, identity cards, and transportation tickets. They may also contain a radio frequency identification (RFID) tag, a transponder device and/or a microchip mostly used for business premises access control or electronic payment.

In most magnetic stripe cards of the related art, the magnetic stripe is contained in a plastic-like film Magstripes can typically be read by most point-of-sale hardware, which are simply general-purpose computers that can be programmed to perform specific tasks. Examples include automatic teller machine (ATM) cards, bank cards (credit and debit cards including those using the Visa and MasterCard systems), gift cards, etc.

Magnetic stripe cloning can be detected by the implementation of magnetic card reader heads and firmware that can read a signature of magnetic noise permanently embedded in all magnetic stripes during the card production process. This signature can be used in conjunction with common two factor authentication schemes utilized in ATM, debit/retail point-of-sale and prepaid card applications.

After swiping a credit card through a reader, the electronic data capture (EDC) software at the point-of-sale (POS) terminal dials a stored telephone number (using a modem) to call an acquirer. An acquirer is an organization that collects credit-authentication requests from merchants and provides the merchants with a payment guarantee.

When the acquirer company gets the credit-card authentication request, it checks the transaction for validity and the record on the magstripe for:

Merchant ID
Valid card number
Expiration date
Credit-card limit
Card usage

Single dial-up transactions are processed at 1,200 to 2,400 bits per second (bps), while direct Internet attachment uses much higher speeds via this protocol. In this system, the cardholder enters a personal identification number (PIN) using a keypad.

The PIN is not on the card; instead, it is encrypted in a database. For example, to get cash from an ATM, the ATM encrypts the PIN, and sends the encrypted PIN to the database to see if there is a match. If the database returns an identical match to the encrypted PIN, then PIN is determined to be correct/valid. The PIN can be either in the bank's computers in an encrypted form (as a cipher) or encrypted on the card itself. The transformation used in this type of cryptography is called one-way. This means that it is easy to compute a cipher given the bank's key and the customer's PIN, but it is not computationally feasible to obtain the plain-text PIN from the cipher, even if the key is known.

Likewise, the communications between the ATM and the bank's central computer are encrypted to prevent would-be thieves from tapping into the phone lines, recording the signals sent to the ATM to authorize the dispensing of cash and then feeding the same signals to the ATM to trick it into unauthorized dispensing of cash.

This protocol is conducted in such a way that it is invisible to the user, except for the necessity of entering the PIN to begin the transaction.

Tokenization is a method for protecting card data by substituting a card's primary account number (PAN) with a unique, randomly generated sequence of numbers, alphanumeric characters, or a combination of a truncated PAN and a random alphanumeric sequence. The token is usually the same length and format as the original PAN, so it appears no different than a standard payment card number to back-end transaction processing systems, applications and storage.

Tokenization, when applied to data security, substitutes a sensitive data element with a non-sensitive equivalent, referred to as a token, that has no extrinsic or exploitable meaning or value. The token is a reference (i.e. identifier) that maps back to the sensitive data through a tokenization system. The mapping from original data to a token uses methods which render tokens infeasible to reverse in the absence of the tokenization system, for example using tokens created from random numbers. The tokenization system must be secured and validated using security best practices applicable to sensitive data protection, secure storage, audit, authentication and authorization. The tokenization system provides data processing applications with the authority and interfaces to request tokens, or detokenize back to sensitive data.

The random sequence, or "token," acts as a substitute value for the actual PAN while the data is at rest inside a retailer's systems. The token can be reversed to its true associated PAN value at any time with the right decryption keys. Tokens can be either single use tokens or multi-use tokens. Tokenization eliminates the need for merchants, e-commerce sites and operators of mobile wallets to store sensitive payment card data on their networks.

FIG. 1 illustrates a process of registering and using a payment instrument on a first user device.

Referring to FIG. 1, a user of a first user device 104 installs a mobile payment system application on the first user device 104. If the user has not previously created an account on the pay system, the user creates the account at operation 103. At operation 105, the user logs in to the pay system.

At operation 107, the user enters information of a payment instrument, e.g., a credit card, at the first user device 104. The information might include, for example, the credit card number, credit card expiration date, CVV number, user name to whom the card was issued, an issuing institution (e.g., a bank, etc.), a billing ZIP code of the user, etc. The information of the payment instrument is encrypted at operation 809 using a key of the associated payment network 808 (e.g., Visa, Mastercard, American Express, Discover, etc.).

At operation 111, the encrypted information of the payment instrument is sent to the pay system 106. At operation 113, the pay system forwards the encrypted payment instrument information to the payment network 108. The payment network 108 decrypts and verifies the payment instrument information at operation 115, and if the information is valid creates an account reference ID for the payment instrument at operation 117. The payment network 108 transmits the account reference ID to the pay system 106 at operation 119, and the pay system 106 stores the account reference ID under the user login at operation 121. The account reference ID may be encrypted before storage.

The payment network 108 generates a token and token ID for the verified payment instrument at operation 123. The token is specific to both the first user device 104 and the account reference ID. The token ID uniquely identifies the token. The payment network 108 returns the token and the token ID to the pay system at operation 125. The token and token ID are indicated as corresponding to the account reference ID.

The pay system 106 stores the token ID under the user login at operation 127. The token ID may be encrypted before storage. The token ID is stored with information that helps distinguish the payment instrument to the user, e.g., a card face illustration, last four digits of the card number, etc. The pay system 106 forwards the token to the first user device 104 at operation 129. The first user device 104 stores the token at operation 131.

Thereafter, the user might decide to securely store or destroy the original payment instrument (e.g., the physical card) so that it cannot be compromised. The user may user the token to conduct a transaction by using the first user device 104 to provide the stored token to a merchant 102, for example, at operation 133. The merchant sends the token with information of the first user device 104 to the payment network 108 at operation 135. The payment network 108 verifies that the token is valid for the user's account and the first user device 104 at operation 137, and authorizes the payment to the merchant 102 (e.g., transfers money from the user's account to the merchant 102's account and sends a transaction confirmation) at operation 139.

Figure 2:
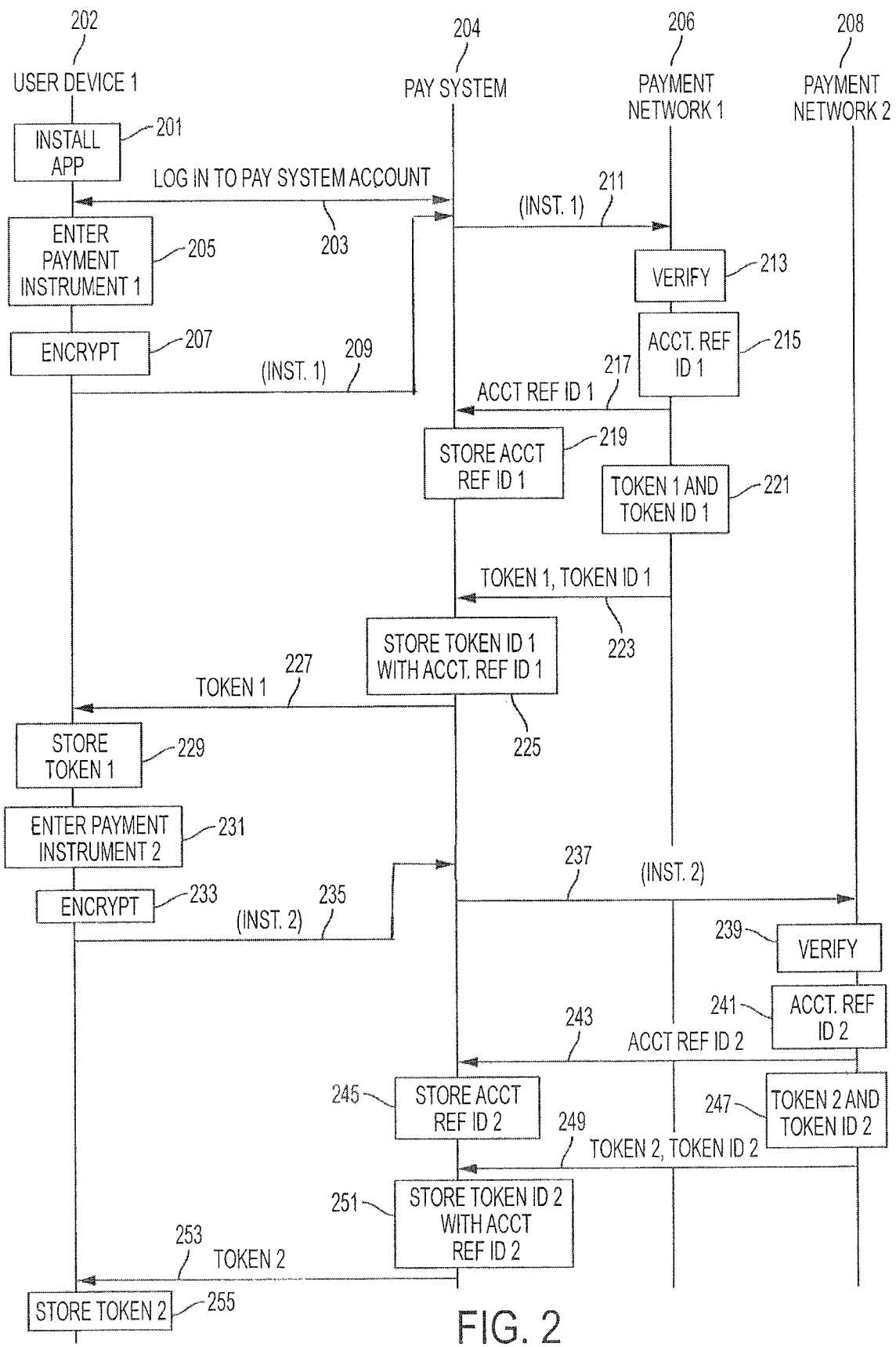
FIG. 2 illustrates a process of registering multiple payment instruments on a first user device according to an embodiment of the present disclosure.

FIG. 2 illustrates a process of registering multiple payment instruments on a first user device.

Referring to FIG. 2, a user installs an application for a pay service 204 to a first user device 202 at operation 201. Alternatively, the application may be pre-installed before the device is purchased. The user logs in to the pay service at operation 203. At operation 205, the user enters information of a first payment instrument, e.g., a credit card, at the first user device 202. The information might include, for example, the credit card number, credit card expiration date, CVV number, user name to whom the card was issued, an issuing institution (e.g., a bank, etc.), a billing ZIP code of the user, etc. The information of the first payment instrument is encrypted at operation 207 using a key of the associated first payment network 206 (e.g., Visa, Mastercard, American Express, Discover, etc.).

At operation 209, the encrypted information of the first payment instrument is sent to the pay system 204. At operation 211, the pay system forwards the encrypted first payment instrument information to the first payment network 206. The first payment network 206 decrypts and verifies the first payment instrument information at operation 213, and if the information is valid creates a first account reference ID for the first payment instrument at operation 215. The first payment network 206 transmits the first account reference ID to the pay system 204 at operation 217, and the pay system 204 stores the first account reference ID under the user login at operation 219. The first account reference ID may be encrypted before storage.

The first payment network 206 generates a first token and first token ID for the verified first payment instrument at operation 221. The first token is specific to both the first user device 202 and the first account reference ID. The first token ID uniquely identifies the first token. The first payment network 206 returns the first token and the first token ID to the pay system at operation 223. The first token and first token ID are indicated as corresponding to the first account reference ID.

The pay system 204 stores the first token ID under the user login at operation 225. The first token ID may be encrypted before storage. The first token ID is stored with information that helps distinguish the first payment instrument to the user, e.g., a card face illustration, last four digits of the card number, etc. The pay system 204 forwards the first token to the first user device 202 at operation 227. The first user device 202 stores the first token at operation 229.

The process is substantially similar for registering a second payment instrument, except that the user is already logged in to the account on the pay system 204. At operation 231, the user enters information of a second payment instrument, e.g., a credit card, at the first user device 202. The information might include, for example, the credit card number, credit card expiration date, CVV number, user name to whom the card was issued, an issuing institution (e.g., a bank, etc.), a billing ZIP code of the user, etc. The information of the second payment instrument is encrypted at operation 233 using a key of the associated second payment network 208 (e.g., Visa, Mastercard, American Express, Discover, etc.).

At operation 235, the encrypted information of the second payment instrument is sent to the pay system 204. At operation 237, the pay system forwards the encrypted second payment instrument information to the second payment network 208. The second payment network 208 decrypts and verifies the second payment instrument information at operation 239, and if the information is valid creates a second account reference ID for the second payment instrument at operation 241. The second payment network 208 transmits the second account reference ID to the pay system 204 at operation 243, and the pay system 204 stores the second account reference ID under the user login at operation 245. The second account reference ID may be encrypted before storage.

The second payment network 208 generates a second token and second token ID for the verified second payment instrument at operation 247. The second token is specific to both the first user device 202 and the second account reference ID. The second token ID uniquely identifies the second token. The second payment network 208 returns the second token and the second token ID to the pay system at operation 249. The second token and second token ID are indicated as corresponding to the second account reference ID.

The pay system 204 stores the second token ID under the user login at operation 251. The second token ID may be encrypted before storage. The second token ID is stored with information that helps distinguish the second payment instrument to the user, e.g., a card face illustration, last four digits of the card number, etc. The pay system 204 forwards the second token to the first user device 202 at operation 253. The first user device 202 stores the second token at operation 255.

In this manner, the first user device 202 may store tokens for use of multiple payment instruments. A user may choose among the available payment instruments using the information that distinguishes the payment instruments, e.g., face illustration, last four digits of a card number, etc., when the user wishes to conduct a transaction.

Figure 8:
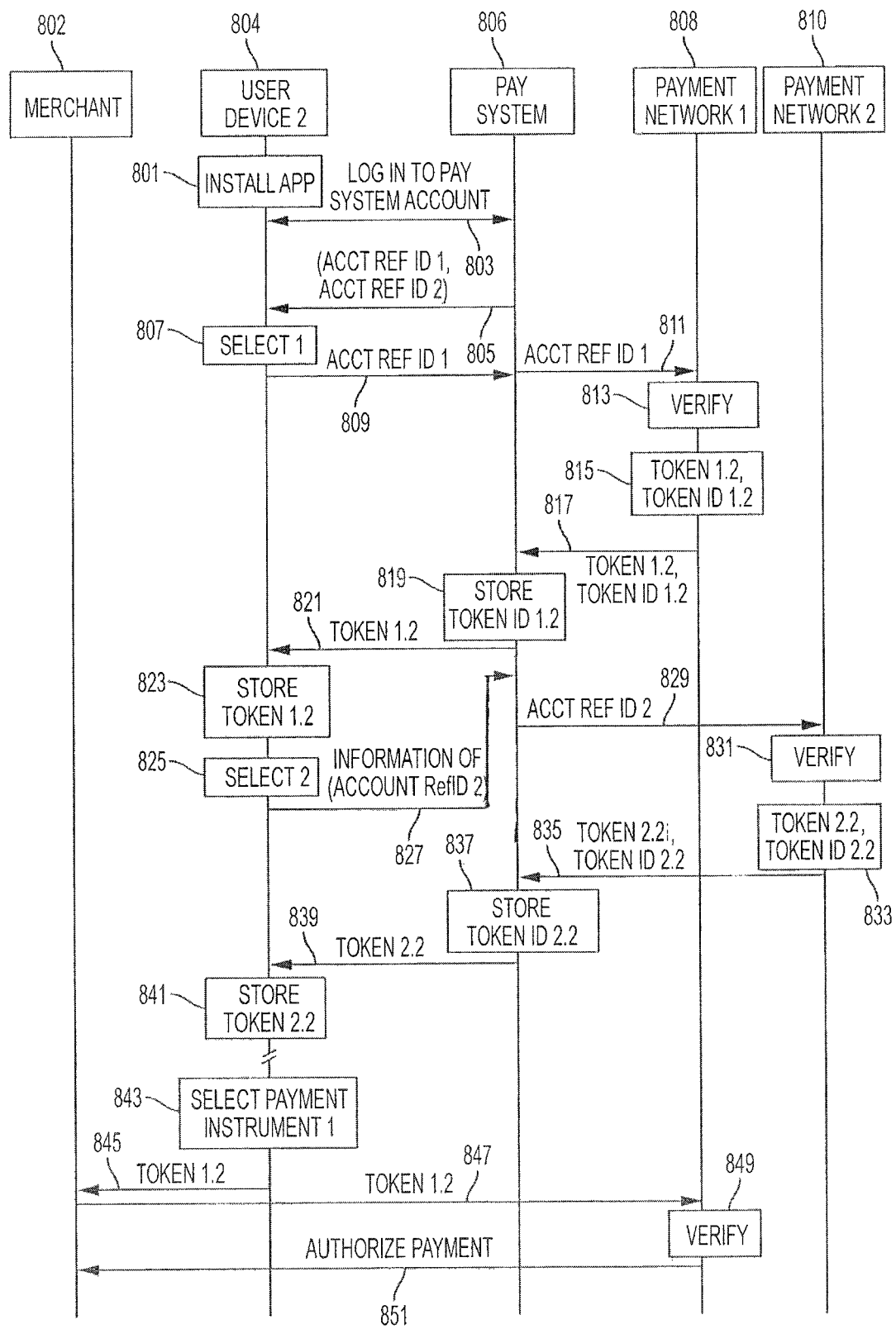
FIG. 8 illustrates a process of adding and using a registered payment instrument to a second user device.

FIG. 8 illustrates a process of adding and using a registered payment instrument to a second user device.

Referring to FIG. 8, consider the case where a user wishes to use the pay system 806 on a second user device 804. In this example, the user has previously established the mobile payment application account and registered payment instruments using a first user device 202. At operation 801, the user installs the pay system application on the second user device 804. The user logs in to the pay system 806 at operation 803.

The pay service 806 determines that the user has previously registered pay instruments and returns information to the second user device 804 indicating information of the registered payment instruments at operation 805. For example, the user might be informed that there are two payment instruments registered and might be presented the option to add either or both of the registered payment instruments to the second user device 804. The registered payment instruments might be identified by corresponding information, e.g., card face illustration, last four digits of a card number, etc.

At operation 807 a registered payment instrument, for example the first payment instrument, is selected using the corresponding information. A message indicating the first payment instrument is selected to be added to the second user device 804 is transmitted to the pay system 806 at operation 809. The pay system 806 determines the first account reference ID corresponding to the information of the selected first payment instrument, and transmits a message to the first payment network 808 including the first account reference ID at operation 811.

The first payment network 808 verifies the first account reference ID at operation 813, and generates a token 1.2 and token ID 1.2 at operation 815. In this example, the '1' in '1.2' indicates the first payment network 808, and the '2' in '1.2' indicates the second user device 804. The token 1.2 and token ID 1.2 are specific to the first payment instrument and the second user device 804. The token 1.2 and token ID 1.2 are transmitted from the first payment network 808 to the pay system 806 at operation 817.

The pay system 806 stores the token ID 1.2 under the user login, with information indicating the token 1.2 corresponds to the first account reference ID and the second user device 804, at operation 819. The token ID 1.2 may be encrypted before storage. At operation 821, the pay system 806 forwards the token 1.2 to the second user device 804 with information the user may use to distinguish the second payment instrument, e.g., a card face illustration, last four digits of a card number, etc. The second user device 804 stores the token 1.2 with the associated distinguishing information at operation 823.

The user may add a token 2.2 for a second registered payment instrument to the second user device 804 in a similar manner at operations 825-841. In this example, the first '2' in '2.2' indicates the second payment network 810, and the second '2' in '2.2' indicates the second user device 804. The operations are substantially similar to those described above and a description thereof will not be repeated.

In this manner, a user may obtain tokens for multiple registered payment instruments on the second device 804. It is not necessary to re-enter any of the information of the registered pay instruments. The user may select which pay instruments he wants enabled for use from each device. The user may then select from among the pay instruments with corresponding tokens installed on each device.

For example, the user may choose to make a purchase from a merchant 802. At operation 843 the user selects a payment instrument, for example, the first payment instrument, from among those registered on the second user device 804, by using the associated information, e.g., a card face illustration, last four digits of account number, etc. The token 1.2 of the selected payment instrument is provided to the merchant 802 from the second user device 804 at operation 845.

The merchant 847 forwards the token 1.2 to the first payment network 808 at operation 847. The first payment network 808 verifies at operation 849 that the token 1.2 is valid to be used by the second user device 804, and authorizes the transaction (e.g., transfers the funds from the account of the first payment instrument to an account of the merchant 802, sends confirmation of the transaction, etc.).

In this manner, multiple registered payment instruments may be selectively installed for use on multiple devices and selectively used from the multiple devices, without re-entering information of the payment instruments. The pay system 806 keeps track of the user login, account reference IDs associated with various payment instruments, and token IDs associated with various tokens. The various tokens are each specific to a user device and a payment instrument. The account reference IDs do not include the corresponding account information (user name, card number, CVV number, billing ZIP code, issuing institution, etc.) and therefore that information cannot be compromised from the account reference IDs even if intercepted or cracked.

Similarly, the tokens and token IDs do not include the corresponding account information (user name, card number, CVV number, billing ZIP code, issuing institution, etc.) and therefore that information cannot be compromised from the tokens or token IDs even if intercepted or cracked.

If the user believes a device might have been compromised, for example, lost or stolen when someone might be able to access the user's pay system account or make a transaction from the device, the user may log in to the pay system account from any other device, or directly contact the pay service, and indicate that the device is lost or stolen. The tokens on the missing device may then be disabled (canceled) remotely according to the stored token IDs. If the user recovers the device, new tokens may be generated and installed as described above. No information of a pay instrument is required to install or disable a token after the initial registration. A user might even forget and destroy all information of the pay instrument after registration in order to minimize the chance of the information ever being compromised.

Tokenization is useful to secure mobile payment applications. Consumers may thus use the tokens to make purchases as with an actual payment card, while merchants may complete a transaction without touching or storing actual PAN data.

In this manner, the user's information such as account number, issuing bank, name, expiration date, zip code, card verification value (CVV), etc., may be stored in a secure (encrypted) form in a card data vault.

When the user determines to use the credit card for a transaction, the token may be passed, with the authentication information (for example, an encrypted PIN, a biometric identification such as a fingerprint, etc.), to authorize the transaction.

Recent developments have provided users the ability to enroll credit cards on electronic devices such as smartphones, tablets, etc. Thus, a payment application storing the corresponding token can be used in place of the physical credit card, if the corresponding authentication information is provided.

In order to make the card enrollment process on secondary devices, a way to access to card information of the cards already enrolled on the primary devices of the consumer is needed. For security concerns, the actual card information of the consumer is not stored locally, as discussed above. Instead, the payment network provides a unique reference for the card that was previously enrolled in the user's primary device. For security reasons, the unique reference provided by the payment network is encrypted and stored along with the consumer's wallet ID (e.g., a unique reference to consumer's online wallet account).

When the consumer installs the mobile payment application on her secondary device using the same walletID, the mobile application payment servers may search for any cards already enrolled for this consumer. If a card is found, instead of the consumer being required to re-enter it, the consumer is asked if they would like to enroll the found card on this secondary device as well. If the consumer consents, the rest of the enrollment process proceeds. The decrypted unique card reference is passed on to the payment network along with other information about the secondary device. A token unique to the secondary device and enrolled card is issued to the secondary device. This sequence of events repeats if the consumer has more than one card enrolled on the primary device.

Embodiments of the present disclosure enable a consumer to save time and effort when the consumer sets up the mobile payment application on a secondary device.

The secondary device may be a second phone, a replacement phone, or an Internet-connected accessory of any type such as a wearable, TV, car, watch or game console.

Figure 3:
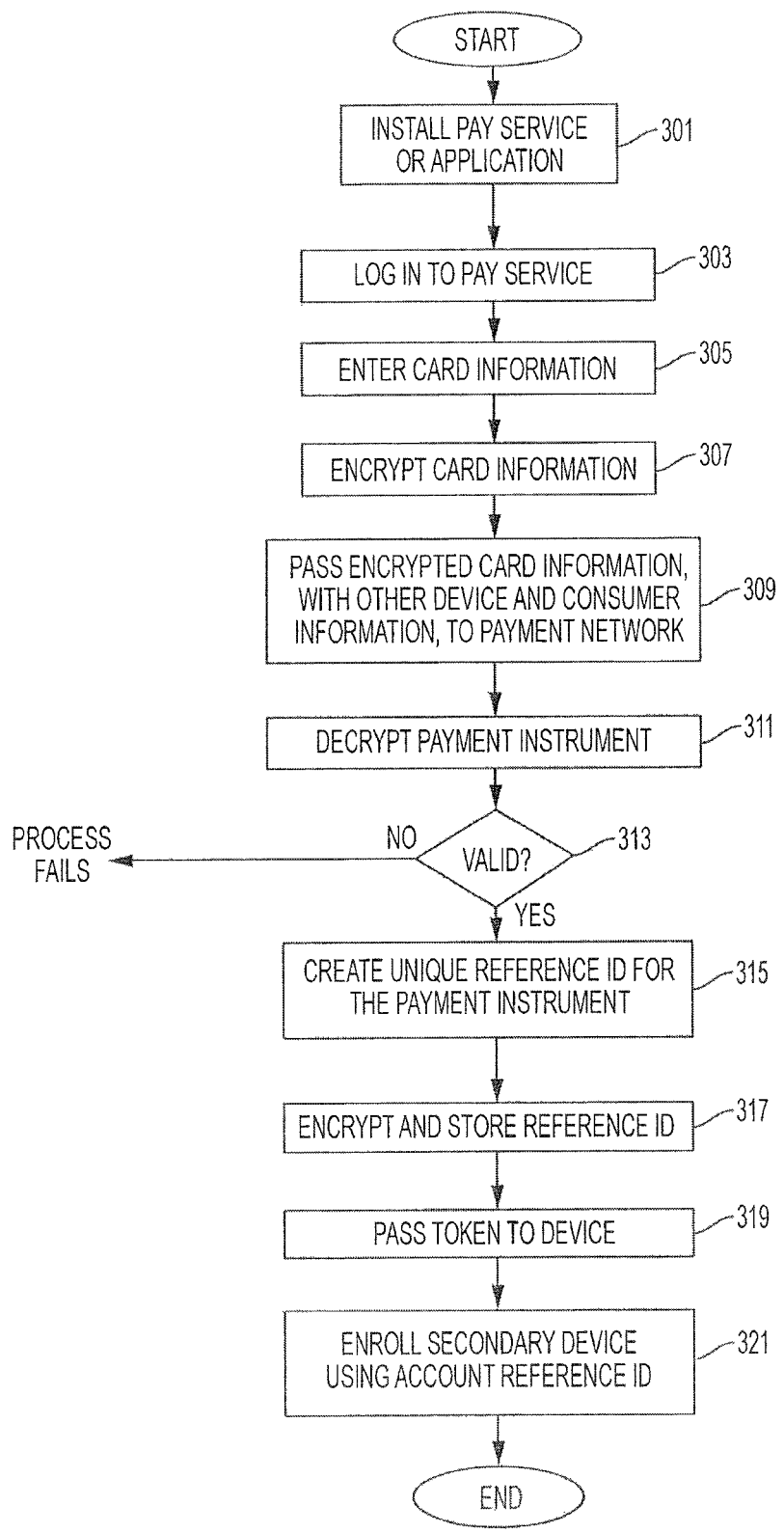
FIG. 3 illustrates a method of reference-based card enrollment for secondary devices according to an embodiment of the present disclosure.

FIG. 3 illustrates a method of reference-based card enrollment for secondary devices according to an exemplary embodiment of the present disclosure.

Referring to FIG. 3, consider that a user has two devices—for example, a smartphone (henceforth referred to as the primary device) and a smartwatch (henceforth referred to as the secondary device. The user first enrolls two cards on her primary device. The procedure to enroll each card is as follows.

At operation 301, a pay service or application (for example, Samsung Pay, Apple Pay, etc.) is installed on the primary device. This may be done by the consumer, or the application may be pre-installed before purchase.

At operation 303, the user uses the device to log into the mobile payment application using a wallet account, e.g., the wallet account the user has on the pay system.

At operation 305, card information is entered to the mobile payment application. For example, the information may be entered by manually typing in the card number, using a magnetic reader to mag swipe the card, wireless entry, near field communication entry, using optical character recognition (OCR) based on photographs of a card, etc.

At operation 307, the payment system encrypts the card information, and at operation 309 passes the encrypted information (payment instrument), along with other device and consumer information, to the payment network (e.g., Visa, MasterCard, etc.). The encryption may be performed, for example, using a public-private key pair algorithm. For example, the primary device may encrypt the card information using its own private key, to verify the sender, and the pay service's public key, so that only the pay service can decrypt the information by using the pay service's private key and the sending device's public key.

At operation 311, the payment network decrypts the payment instrument as described above, and validates the payment instrument. The payment network evaluates the information received and determines whether a token should be issued to this particular consumer on this particular device. The payment network might require the consumer to perform certain steps to authenticate and authorize their accounts. These steps ensure that the consumer enrolling the payment instrument is authorized. The authentication may, for example, include verifying the user of the pay service account and the device being registered to the user.

If the payment network determines at operation 313 that the payment instrument is valid (the user is authorized, and/or the device is registered to the user), then at operation 315 the payment network creates a unique reference for the consumer's payment instrument. The reference ID is a unique reference for the payment instrument. For example, the reference ID may include a routing number, card/account number, user name, CVV, billing zip code, encrypted PIN or other security information, etc. The reference ID may be information used for a transaction, e.g., a POS purchase. Information of the reference ID is then sent back to the consumer via the payment system. Henceforth, this unique reference will be referred to as an account reference ID.

The payment system encrypts the account reference ID and stores it at operation 317. The payment system generates and passes on the token information to the consumer's device at operation 319. The account reference ID can then be used to enroll any secondary devices the consumer may own at operation 321.

The consumer can repeat the above mentioned steps to enroll a new card. That is, the consumer can enroll multiple cards, each with its own account reference ID, with the pay service. In this case, the application on the device will indicate each account reference ID corresponding to an enrolled card. When the user attempts to use the pay service, any of the enrolled cards may be used. The user may set a default card or order of cards to use, or may be prompted to select which card to use.

Each enrolled card may be indicated on the device (i.e., in the application) with a corresponding image. For example, the image might be a logo of the bank issuing the card, card face art of the actual physical card, or another image selected by the user to enable ready distinction among the enrolled cards.

Once the tokenization process is completed on the consumer's primary device, the user can begin to enroll the same payment instrument on the secondary devices. The account reference ID may be used to accomplish this. The payment network maintains a mapping of the account reference ID with the actual payment instrument of the consumer. Hence, the enrollment can be requested without the secondary device explicitly passing the card information again.

Figure 4:
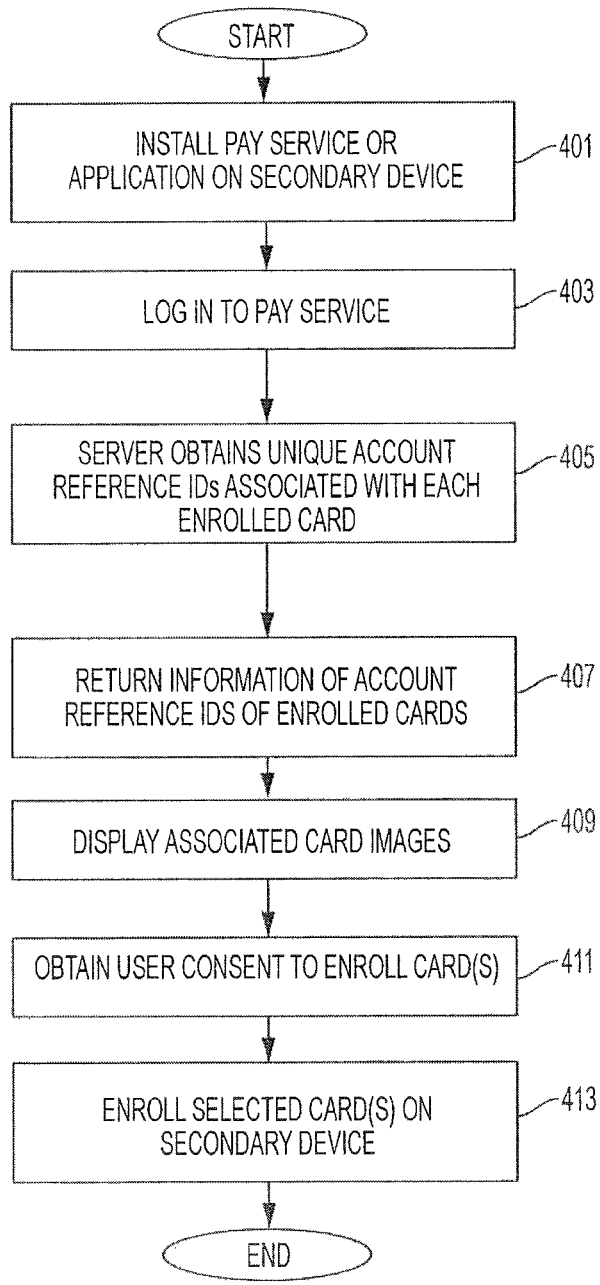
FIG. 4 illustrates a method of reference-based card enrollment for secondary devices according to an embodiment of the present disclosure.

FIG. 4 illustrates a method of reference-based card enrollment for secondary devices according to an exemplary embodiment of the present disclosure.

Referring to FIG. 4, the consumer takes the following steps to enroll the two cards on her secondary device.

At operation 401, the mobile payment application is installed on the secondary device. For example, the user's primary device may be her phone, and the secondary device may be a tablet. Installation may be performed by the user, or the application may be pre-installed before the device is purchased.

At operation 403, the user logs into the pay service using her account, e.g., her wallet account. The user logs into the pay service from the secondary device. For example, the user may log in to the pay service using a pay service application installed on the secondary device.

If this consumer has previously enrolled one or more cards on another device (in this case, her primary device, e.g., her phone), then the server will obtain the unique account reference IDs associated with each card at operation 405, according to the account.

The server will return information of the account reference IDs of the enrolled cards to the secondary device at operation 407. For example, the information may include a logo of an issuing bank, at least part of the card number, an image of card art, etc.

Information of the cards, e.g., the card art associated with these enrolled cards, will be displayed on the application seeking the consumer's consent to complete the enrollment action at operation 409. For example, if two cards are enrolled under the user's account in the pay service, card art of those cards may be displayed. The user may then select which card or cards the user consents to enroll on the secondary device. For example, the cards may be indicated as available but not enrolled, e.g., the card art may be half shaded or another indication may be provided.

The user selects which of the available cards she wishes to enroll on the secondary device. Upon obtaining the consumer's consent at operation 411, the selected card will be enrolled on the secondary device at operation 413. Enrollment of the card may include the server providing a token corresponding to the stored account reference ID for each selected card to enroll.

In this manner, it is not necessary for the user to re-enter any of the card information. It is not even necessary for the user to retain the physical card. The user might, for example, destroy or physically lock up the credit card in a safe, after the account reference ID is created on the pay service. This may preclude the physical card from becoming lost or stolen, while still allowing the user to enroll and use the credit card on different devices by using her pay service account.

The above mentioned steps can be repeated for each card the consumer had previously enrolled on her primary device.

Figure 5:
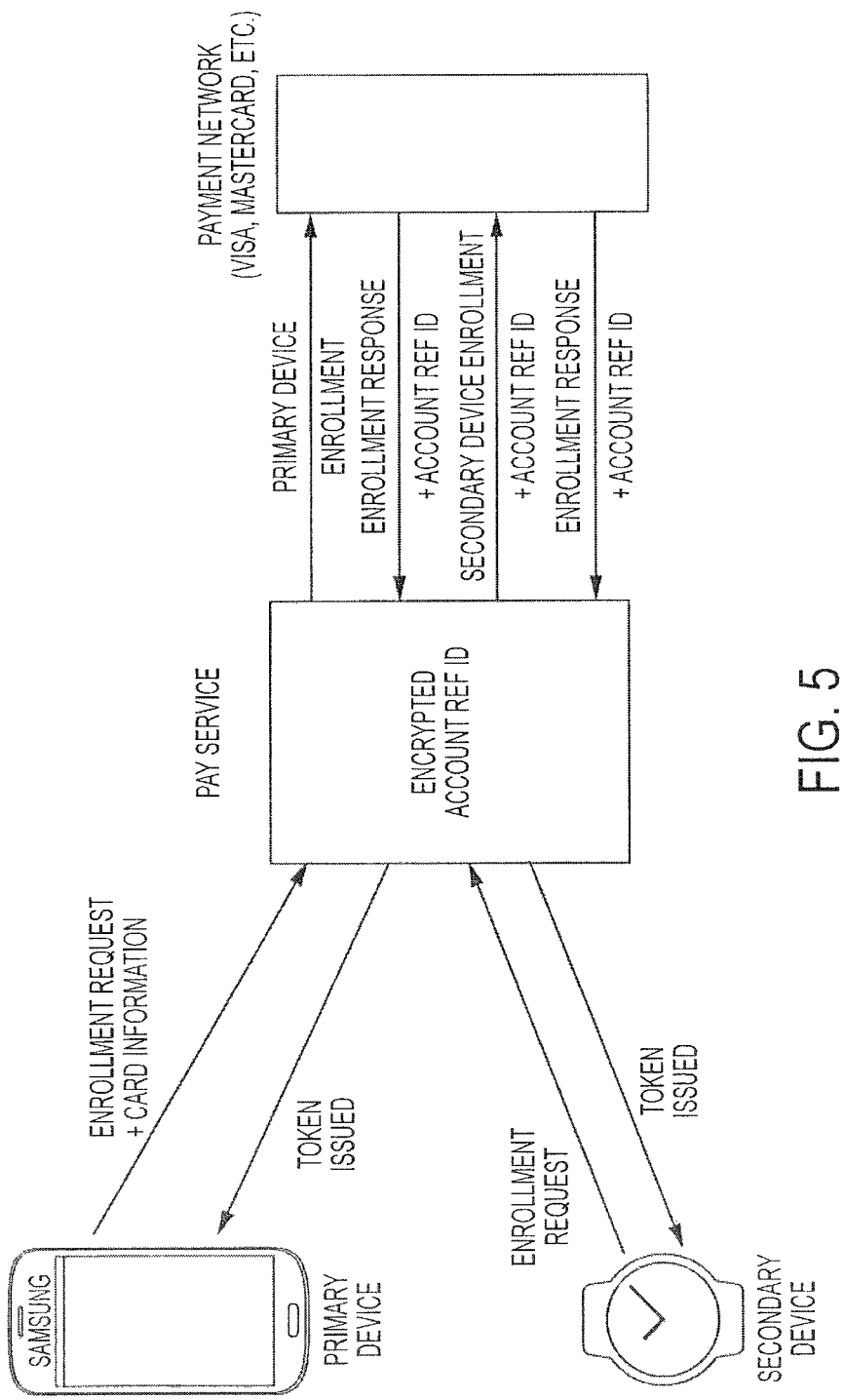
FIG. 5 illustrates a relationship between a primary device, a secondary device, a pay service, and a payment network, according to an embodiment of the present disclosure.

FIG. 5 illustrates a relationship between a primary device, a secondary device, a pay service, and a payment network, according to an embodiment of the present disclosure. Although one payment network is depicted, the present disclosure is not limited thereto.

Figure 6:
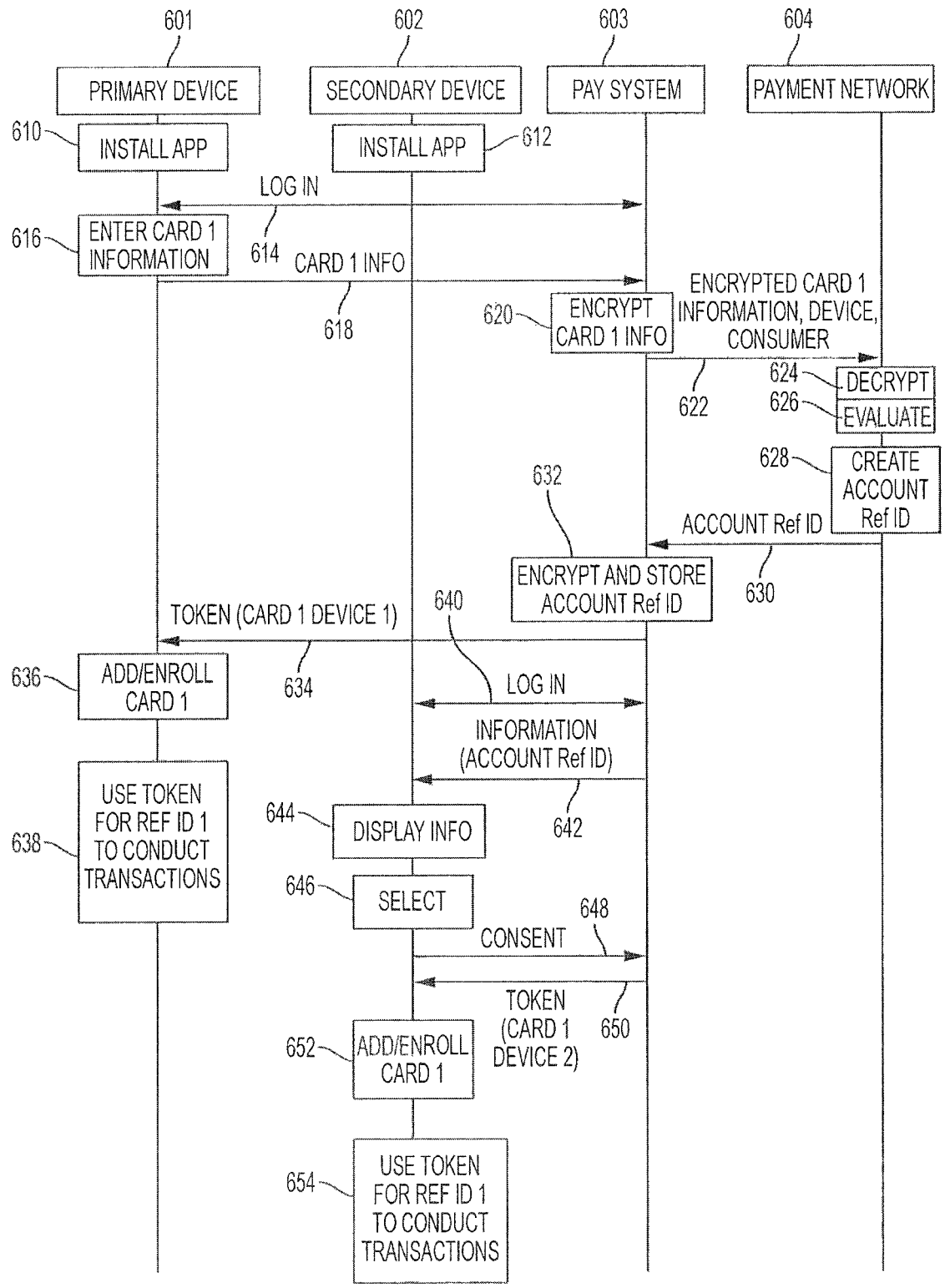
FIG. 6 illustrates a process of reference based card enrollment according to an embodiment of the present disclosure.

FIG. 6 illustrates a process of reference based card enrollment according to an embodiment of the present disclosure.

Referring to FIGS. 5 and 6, a primary device 601 (e.g., a smartphone) installs a pay service application at operation 610, and a secondary device 602 (e.g., a tablet, smartwatch, etc.) installs the pay service application at operation 612. These installations may be performed concurrently or separately in any order.

At operation 614, a user logs in to pay system 603 using the application installed on the primary device 601. At operation 616, the user enters information of a first credit card, and the information is transmitted to the pay system 603 at operation 618.

The pay service or system 603 encrypts the credit card information at operation 620, and transmits the encrypted information at operation 622 to a payment network 604 (e.g., Visa, Mastercard, etc.).

The payment network 604 decrypts the information at operation 624 and evaluates the decrypted information at operation 626. If the information is valid, the payment network 604 creates a unique account reference ID corresponding to the credit card information, at operation 628. The account reference ID may be used to make purchased, conduct transactions, etc. The payment network 604 returns the account reference ID for the first credit card at operation 630.

The pay system 603 encrypts and stores the account reference ID at operation 632. The pay system 603 generates a token based on the first credit card account reference ID and transmits the token to the primary device 601 at operation 634.

The primary device 601 enrolls the first credit card using the token, at operation 636. The primary device 601 can subsequently use the token to make purchases, conduct transactions, etc. The account reference ID and the credit card information such as name, account number, etc., do not need to be stored on the primary device 601.

At operation 640, the secondary device 602 logs in to the pay system 603. In response, the pay system 603 determines what account reference IDs correspond to the user's account on the pay system 603, and returns information of the corresponding credit cards to the secondary device 602.

The secondary device 602 displays information corresponding to the account reference ID, e.g., card art, at operation 644. The user selects a card by the displayed card art at operation 646, and the secondary device 602 returns information of the selected card (i.e., consent to enroll the card) at operation 648.

The pay system 603 returns the token, for the reference account ID corresponding to the first credit card, to the secondary device 602 at operation 650.

The secondary device 602 saves the token to enroll the card at operation 652. It is not necessary for the secondary device 602 to receive or store any of the information such as the PAN, user name, etc.

Thereafter, the secondary device 602 may make purchases, conduct transactions, etc., by using the token corresponding to the account reference ID of the first card.

Figure 7:
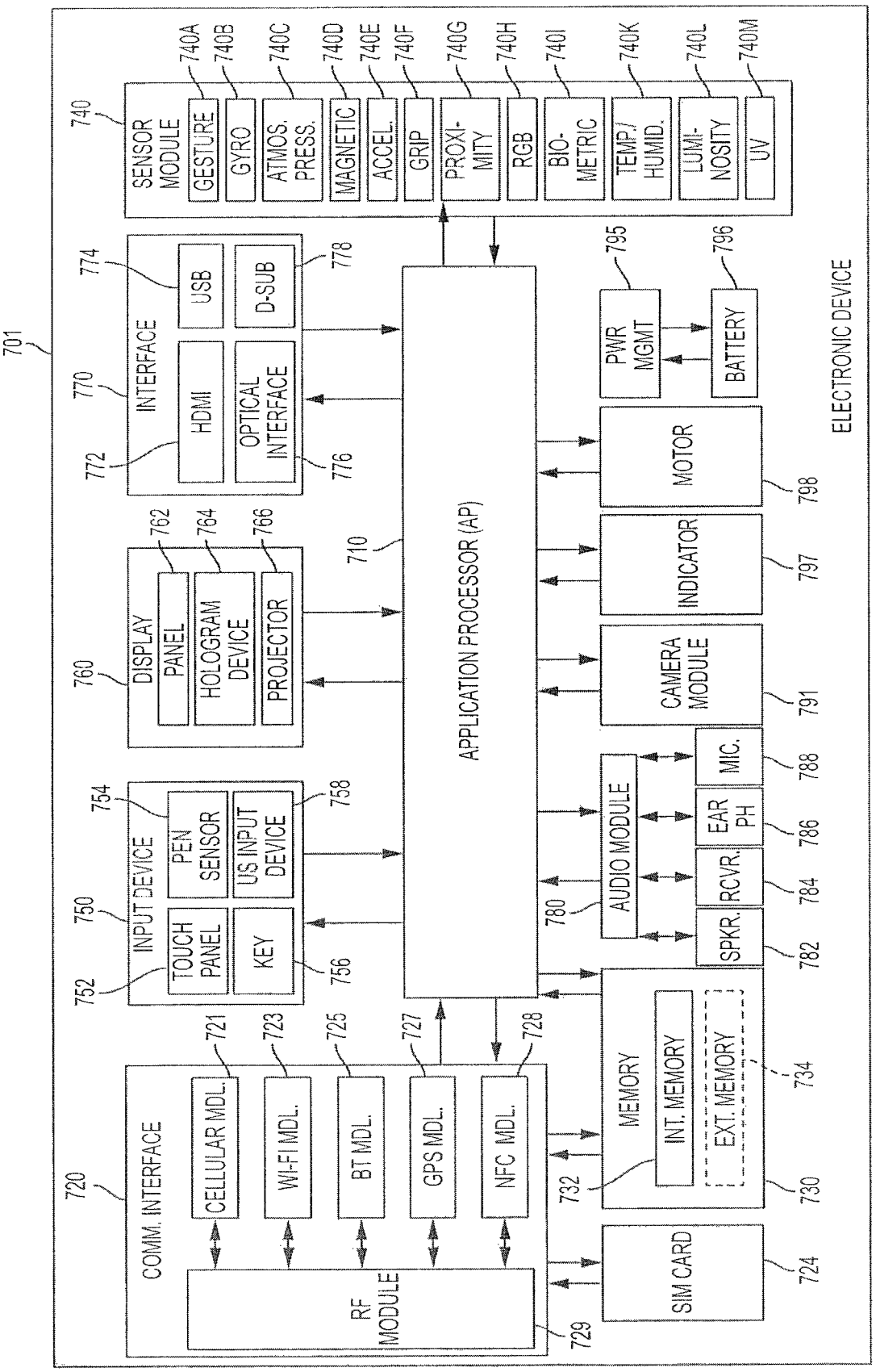
FIG. 7 is a block diagram of a portable device according to an embodiment of the present disclosure.

FIG. 7 is a block diagram of a portable device according to an embodiment of the present disclosure.

Referring to FIG. 7, an electronic device 701 according to embodiments of the present disclosure may include one or more processors (e.g., APs) 710, a communication module 720, a subscriber identification module (SIM) 724, a memory 730, a sensor module 740, an input device 750, a display 760, an interface 770, an audio module 780, a camera module 791, a power management module 795, a battery 796, an indicator 797, and a motor 798.

The processor 710 may be plural, and controls general and specific functions of the device, including processing and generating data. The processor 710 may control multiple hardware and software components connected to the processor 210 by running, e.g., an OS or application programs, and the processor 710 may process and compute various data. The processor 710 may be implemented in, e.g., a system on chip (SoC). According to an embodiment of the present disclosure, the processor 710 may further include a graphic processing unit (GPU) and/or an image signal processor (ISP). The processor 710 may load a command or data received from at least one of other components (e.g., a non-volatile memory) on a volatile memory, processor the command or data, and store various data in the non-volatile memory.

The communication module 720 may include, e.g., cellular module 721, a Wi-Fi module 723, a BT module 725, a GNSS module 727, an NFC module 728, and a radio frequency (RF) module 729.

The cellular module 721 may provide voice call, video call, text, or Internet services through, e.g., a communication network. The cellular module 721 may perform identification or authentication on the electronic device 701 in the communication network using a SIM 724 (e.g., the SIM card). According to an embodiment of the present disclosure, the cellular module 721 may perform at least some of the functions provided by the processor 710. According to an embodiment of the present disclosure, the cellular module 721 may include a CP.

The Wi-Fi module 723, the BT module 225, the GNSS module 727, or the NFC module 728 may include a process for, e.g., processing data communicated through the module. At least some (e.g., two or more) of the cellular module 721, the Wi-Fi module 723, the BT module 725, the GNSS module 727, and the NFC module 728 may be included in a single integrated circuit (IC) or an IC package.

The RF module 729 may communicate data, e.g., communication signals (e.g., RF signals). The RF module 729 may include, e.g., a transceiver, a power amplifier module (PAM), a frequency filter, a low noise amplifier (LNA), or an antenna. According to an embodiment of the present disclosure, at least one of the cellular module 721, the Wi-Fi module 723, the BT module 725, the GNSS module 727, and the NFC module 728 may communicate RF signals through a separate RF module.

The SIM 724 may include, e.g., a card including a SIM and/or an embedded SIM, and may contain unique identification information (e.g., an integrated circuit card identifier (ICCID) or subscriber information (e.g., an international mobile subscriber identity (IMSI)).

The memory 730 may include, e.g., an internal memory 732 or an external memory 734. The internal memory 732 may include at least one of, e.g., a volatile memory (e.g., a dynamic random access memory (DRAM), a static RAM (SRAM), a synchronous DRAM (SDRAM), etc.) and a non-volatile memory (e.g., a one-time programmable read-only memory (OTPROM), a PROM, an erasable and programmable ROM (EPROM), an electrically EPROM (EEPROM), a mask ROM, a flash ROM, a flash memory (e.g., a NAND flash, or a NOR flash), a hard drive, or solid state drive (SSD).

The external memory 734 may include a flash drive, e.g., a compact flash (CF) memory, a secure digital (SD) memory, a micro-SD memory, a mini-SD memory, an extreme digital (xD) memory, or a memory stick. The external memory 734 may be functionally and/or physically connected with the electronic device 201 via various interfaces.

For example, the sensor module 740 may measure a physical quantity or detect a motion state of the electronic device 701, and the sensor module 740 may convert the measured or detected information into an electrical signal. The sensor module 740 may include at least one of, e.g., a gesture sensor 740A, a gyro sensor 740B, an air pressure sensor 740C, a magnetic sensor 740D, an acceleration sensor 740E, a grip sensor 740F, a proximity sensor 740G, a color sensor 740H (e.g., a red-green-blue (RGB) sensor, a biometric sensor 740I, a temperature/humidity sensor 740J, an illumination sensor 740K, and an ultra violet (UV) sensor 740M. Additionally or alternatively, the sensing module 740 may include, e.g., one of an E-nose sensor, an electromyography (EMG) sensor, an electroencephalogram (EEG) sensor, an electrocardiogram (ECG) sensor, an infrared (IR) sensor, an iris sensor, and a finger print sensor.

The sensor module 740 may further include a control circuit for controlling at least one or more of the sensors included in the sensing module. According to an embodiment of the present disclosure, the electronic device 701 may further include a processor configured to control the sensor module 240 as part of an AP 710 or separately from the AP 710, and the electronic device 701 may control the sensor module 740 while the AP 710 is in a sleep mode.

The input device 750 may include, e.g., at least one of a touch panel 752, a (digital) pen sensor 754, a key 756, and an ultrasonic input device 758. The touch panel 752 may use at least one of capacitive, resistive, infrared, and ultrasonic methods. The touch panel 752 may further include a control circuit. The touch panel 752 may further include a tactile layer and may provide a user with a tactile reaction.

The (digital) pen sensor 754 may include, e.g., a part of a touch panel or a separate sheet for recognition. The key 756 may include e.g., one of a physical button, an optical key, and a key pad. The ultrasonic input device 758 may use an input tool that generates an ultrasonic signal and enables the electronic device 701 to identify data by sensing the ultrasonic signal to a microphone (e.g., microphone 788).

The display 760 (e.g., the display 160) may include one of a panel 762, a hologram device 764, and a projector 766. The panel 762 may be configured to be at least one of flexible, transparent, and wearable. The panel 762 may also be incorporated with the touch panel 752 in a module. The hologram device 764 may make three dimensional (3D) images (holograms) in the air by using light interference. The projector 766 may display an image by projecting light onto a screen. The screen may be, for example, located inside or outside of the electronic device 701. In accordance with an embodiment of the present disclosure, the display 260 may further include a control circuit to control the panel 762, the hologram device 764, or the projector 766.

The interface 770 may include e.g., an HDMI 772, a USB 774, an optical interface 776, or a D-subminiature (D-sub) 778. Additionally or alternatively, the interface 770 may include a mobile high-definition Link (MHL) interface, an SD card/multimedia card (MMC) interface, or infrared data association (IrDA) standard interface.

The audio module 780 may convert a sound into an electric signal or vice versa, for example. The audio module 780 may process sound information input or output through e.g., one of a speaker 782, a receiver 784, an earphone 786, and a microphone 788.

For example, the camera module 791 may be a device for capturing still images and videos, and may include, according to an embodiment of the present disclosure, at least one of one or more image sensors (e.g., front and back sensors), a lens, an ISP, and a flash such as a LED or xenon lamp.

The power manager module 795 may manage power of the electronic device 201, for example. Although not shown, according to an embodiment of the present disclosure, the power manager module 795 may include one of a power management integrated circuit (PMIC), a charger IC, a battery gauge, and a fuel gauge.

The PMIC may have a wired and/or wireless recharging scheme. The wireless charging scheme may include e.g., one of a magnetic resonance scheme, a magnetic induction scheme, and an electromagnetic wave based scheme, and an additional circuit, such as a coil loop, a resonance circuit, a rectifier, and the like may be added for wireless charging. The battery gauge may measure an amount of remaining power of at least one of the battery 796, a voltage, a current, and a temperature while the battery 796 is being charged. The battery 796 may include, e.g., one of a rechargeable battery and a solar battery.

The indicator 797 may indicate a particular state of the electronic device 701 or a part (e.g., the processor 710) of the electronic device, including e.g., at least one of a booting state, a message state, and a recharging state. The motor 798 may convert an electric signal to a mechanical vibration and may generate a vibrational or haptic effect. Although not shown, a processing unit for supporting mobile TV, such as a GPU may be included in the electronic device 701. The processing unit for supporting mobile TV may process media data conforming to a standard for digital multimedia broadcasting (DMB), digital video broadcasting (DVB), or mediaFlo™.

Each of the aforementioned components of the electronic device may include one or more parts, and a name of the part may vary with a type of the electronic device. The electronic device in accordance with various embodiments of the present disclosure may include at least one of the aforementioned components, omit some of them, or include other additional component(s). Some of the components may be combined into an entity, but the entity may perform the same functions as the components.

It will be appreciated that various embodiments of the present disclosure according to the claims and description in the specification can be realized in the form of hardware, software or a combination of hardware and software.

Any such software may be stored in a non-transitory computer readable storage medium. The non-transitory computer readable storage medium stores one or more programs (software modules), the one or more programs comprising instructions, which when executed by one or more processors in an electronic device, cause the electronic device to perform a method of the present disclosure.

Any such software may be stored in the form of volatile or non-volatile storage such as, for example, a storage device like a Read Only Memory (ROM), whether erasable or rewritable or not, or in the form of memory such as, for example, Random Access Memory (RAM), memory chips, device or integrated circuits or on an optically or magnetically readable medium such as, for example, a Compact Disk (CD), Digital Versatile Disc (DVD), magnetic disk or magnetic tape or the like. It will be appreciated that the storage devices and storage media are various embodiments of non-transitory machine-readable storage that are suitable for storing a program or programs comprising instructions that, when executed, implement various embodiments of the present disclosure. Accordingly, various embodiments provide a program comprising code for implementing apparatus or a method as claimed in any one of the claims of this specification and a non-transitory machine-readable storage storing such a program.

While the disclosure has been shown and described with reference to various embodiments thereof, it will be understood by those skilled in the art that various changes in form and details may be made therein without departing from the spirit and scope of the disclosure as defined by the appended claims and their equivalents. Various embodiments of the present disclosure are described as examples only and are noted intended to limit the scope of the present disclosure. Accordingly, the scope of the present disclosure should be understood as to include any and all modifications that may be made without departing from the technical spirit of the present disclosure.

What is claimed is:

1. A method by a first server system for reference-based card enrollment for secondary devices, the method comprising:
    receiving, from a first mobile device that is logged into the first server system via a user account identified by a wallet identification (ID), information of a payment instrument;
    transmitting a first encrypted signal to a second server system of a payment network, the first encrypted signal including the information of the payment instrument;
    receiving, from the second server system, a second signal including a unique account reference ID corresponding to the payment instrument and based on a mapping of the account reference ID to the payment instrument;
    storing the account reference ID in association with the wallet ID;
    detecting a login of a second mobile device into the first server system via the user account on the first server system;
    determining, by the first server system, whether the account reference ID corresponds to the user account via which the login of the second mobile device was detected by:
        searching for one or more account reference IDs stored at the first server system in association with the wallet ID; and
        determining that the account reference ID corresponds to the user account via which the login of the second mobile device was detected based on the account reference ID being among the one or more account reference IDs;
    generating a token that is specific to the account reference ID for the second mobile device based on the determination that the account reference ID corresponds to the user account via which the login of the second mobile device was detected, wherein generating the token includes:
        creating a relationship such that, when the token is received by the second server system, the second server system is able to verify that the token is valid for use by the second mobile device and the user account identified by the wallet ID and that the token corresponds to the account reference ID mapped to the payment instrument; and
    after the relationship is created, transmitting, by the first server system, a third signal to the second mobile device, the third signal comprising the token that, upon receipt by the second mobile device, configures the second mobile device to conduct payment transactions using the token.

2. The method of claim 1, wherein the information of the payment instrument comprises credit card information.

3. The method of claim 1, wherein the second server system creates and returns the account reference ID only if the second server system evaluates the information of the payment instrument as valid.

4. The method of claim 1, wherein the account reference ID and the token do not include the information of the payment instrument.

5. The method of claim 1, wherein the account reference ID is stored with the information of the payment instrument.

6. The method of claim 1, further comprising:
    receiving a first token and a corresponding token ID that identifies the first token, the first token corresponding to the account reference ID and to the second mobile device; and
    storing the token ID in association with the wallet ID and an indicator that the first token corresponds to both the account reference ID and the second mobile device;
    wherein the generated token is a second token that uniquely corresponds to both the account reference ID and the second mobile device.

7. The method of claim 6, wherein the first token uniquely corresponds to the first mobile device and the account reference ID.

8. The method of claim 1, further comprising:
    based on the determination that the account reference ID corresponds to the user account via which the login of the second mobile device was detected, transmitting, by the first server system, a fourth signal to the second mobile device, the fourth signal including information corresponding to the account reference ID to be displayed by the second mobile device;
    receiving, from the second mobile device, a message indicating selection of the payment instrument according to the information corresponding to the account reference ID displayed by the second mobile device;
    obtaining a second token that corresponds to the second mobile device and the account reference ID; and
    transmitting the second token to the second mobile device.

9. The method of claim 8, wherein the payment instrument comprises one of a plurality of payment instruments each having a corresponding unique account reference ID.

10. The method of claim 9, wherein:
a second payment instrument of the plurality of payment instruments is not selected, and
the second token is obtained for the second mobile device only for the selected payment instrument.

11. The method of claim 9, wherein the account reference ID, the token, and the second token do not include information of any of the plurality of payment instruments.

12. The method of claim 1, wherein the information of the payment instrument is not entered or stored on the second mobile device.

13. The method of claim 8, wherein:
the information of the payment instrument comprises a card art of the payment instrument, and
the information corresponding to the account reference ID to be displayed by the second mobile device includes the information of the payment instrument.

14. A first server comprising:
at least one processor; and
at least one memory storing instructions to be executed by the at least one processor, wherein the instructions when executed by the at least one processor cause the at least one processor to:
receive, from a first mobile device that is logged into the first server via a user account identified by a wallet identification (ID), information of a payment instrument;
transmit a first encrypted signal to a second server of a payment network, the first encrypted signal including the information of the payment instrument;
receive, from the second server, a second signal including a unique account reference ID corresponding to the payment instrument and based on a mapping of the account reference ID to the payment instrument;
store, in the at least one memory, the account reference ID in association with the wallet ID;
detect a login of a second mobile device into the first server via the user account on the first server;
determine whether the account reference ID corresponds to the user account via which the login of the second mobile device was detected, wherein the instructions that when executed cause the at least one processor to determine whether the account reference ID corresponds to the user account comprise instructions that when executed cause the at least one processor to:
search for one or more account reference IDs stored at the first server in association with the wallet ID; and
determine that the account reference ID corresponds to the user account via which the login of the second mobile device was detected based on the account reference ID being among the one or more account reference IDs;
generate a token that is specific to the account reference ID for the second mobile device based on the determination that the account reference ID corresponds to the user account via which the login of the second mobile device was detected, wherein the instructions that when executed cause the at least one processor to generate the token comprise instructions that when executed cause the at least one processor to:
create a relationship such that, when the token is received by the second server, the second server is able to verify that the token is valid for use by the second mobile device and the user account identified by the wallet ID and that the token corresponds to the account reference ID mapped to the payment instrument; and
after the relationship is created, transmit, by a transmitter coupled to the at least one processor, a third signal to the second mobile device, the third signal comprising the token that, upon receipt by the second mobile device, configures the second mobile device to conduct payment transactions using the token.

15. The first server of claim 14, wherein the instructions when executed further cause the at least one processor to store, at the first server, the account reference ID in association with the user account on the first server.

16. The first server of claim 14, wherein the instructions when executed further cause the at least one processor to:
receive a first token and a corresponding token ID that identifies the first token, the first token corresponding to the account reference ID and to the second mobile device; and
store the token ID in association with the wallet ID and an indicator that the first token corresponds to both the account reference ID and the second mobile device;
wherein the generated token is a second token that uniquely corresponds to both the account reference ID and the second mobile device.

17. A non-transitory computer readable medium comprising a plurality of instructions that, when executed by at least one processor, is configured to cause the at least one processor to:
receive, from a first mobile device that is logged into a first server system via a user account identified by a wallet identification (ID), information of a payment instrument;
transmit a first encrypted signal to a second server system of a payment network, the first encrypted signal including the information of the payment instrument;
receive, from the second server system, a second signal including a unique account reference ID corresponding to the payment instrument and based on a mapping of the account reference ID to the payment instrument;
store the account reference ID in association with the wallet ID;
detect a login of a second mobile device into the first server system via the user account on the first server system;
determine whether the account reference ID corresponds to the user account via which the login of the second mobile device was detected, wherein the instructions that when executed cause the at least one processor to determine whether the account reference ID corresponds to the user account comprise instructions that when executed cause the at least one processor to:
search for one or more account reference IDs stored at the first server system in association with the wallet ID; and
determine that the account reference ID corresponds to the user account via which the login of the second mobile device was detected based on the account reference ID being among the one or more account reference IDs;
generate a token that is specific to the account reference ID for the second mobile device based on the determination that the account reference ID corresponds to the user account via which the login of the second mobile device was detected, wherein the instructions that when executed cause the at least one processor to generate the token comprise instructions that when executed cause the at least one processor to:

create a relationship such that, when the token is received by the second server system, the second server system is able to verify that the token is valid for use by the second mobile device and the user account identified by the wallet ID and that the token corresponds to the account reference ID mapped to the payment instrument; and after the relationship is created, initiate transmission, by a transmitter coupled to the at least one processor, of a third signal to the second mobile device, the third signal comprising the token that, upon receipt by the second mobile device, configures the second mobile device to conduct payment transactions using the token.

18. The non-transitory computer readable medium of claim 17, wherein receiving the account reference ID and the token do not include the information of the payment instrument.

19. The non-transitory computer readable medium of claim 17, wherein the instructions when executed are further configured to cause the at least one processor to:

receive a first token and a corresponding token ID that identifies the first token, the first token corresponding to the account reference ID and to the second mobile device; and store the token ID in association with the wallet ID and an indicator that the first token corresponds to both the account reference ID and the second mobile device;

wherein the generated token is a second token that uniquely corresponds to both the account reference ID and the second mobile device.

20. The non-transitory computer readable medium of claim 17, wherein the instructions when executed are further configured to cause the at least one processor to:

based on the determination that the account reference ID corresponds to the user account via which the login of the second mobile device was detected, transmit, by the first server system, a fourth signal to the second mobile device, the fourth signal including information corresponding to the account reference ID to be displayed by the second mobile device;

receive, from the second mobile device, a message indicating selection of the payment instrument according to the information corresponding to the account reference ID displayed by the second mobile device;

obtain a second token that corresponds to the second mobile device and the account reference ID; and transmit the second token to the second mobile device.

* * * * *